United States Patent [19]
Noir

[11] 3,820,815
[45] June 28, 1974

[54] CONNECTING DEVICE FOR ATTACHING SAFETY BELT TO VEHICLE FLOOR

[76] Inventor: Rene Noir, 17 Rue Louise-Michel 92, Levallois Perret, France

[22] Filed: Apr. 10, 1972

[21] Appl. No.: 242,644

[30] Foreign Application Priority Data
Apr. 8, 1971 France .............................. 71.12472

[52] U.S. Cl. .......................... 280/150 SB, 287/20.5
[51] Int. Cl. ............................................ B60r 21/10
[58] Field of Search ............... 280/150 SB; 188/1 B; 287/20, 20.5

[56] References Cited
UNITED STATES PATENTS

| | | | |
|---|---|---|---|
| 2,280,694 | 4/1942 | Embree | 280/150 SB |
| 2,716,561 | 8/1955 | Beran | 280/150 SB |
| 2,904,347 | 9/1959 | Tucker | 280/150 SB |

FOREIGN PATENTS OR APPLICATIONS
1,364,728   5/1964   France .......................... 280/150 SB

*Primary Examiner*—Robert R. Song
*Attorney, Agent, or Firm*—Robert E. Burns; Emmanuel J. Lobato; Bruce L. Adams

[57] ABSTRACT

A connecting device for attaching a safety belt to the floor of motor vehicle comprises a steel bar of small cross section each end of which is provided with an enlarged head by cold upsetting. The head at one end of the bar is received in a socket of a coupling member of the belt and the head at the other end of the bar is received in a socket of an anchoring member secured to the vehicle floor. In one form, the socket comprises a cylindrical shaft having a diametral perforation through which the rod passes. Each head of the rod preferably has an annular flat bearing face which engages an anchoring face of the socket.

11 Claims, 14 Drawing Figures

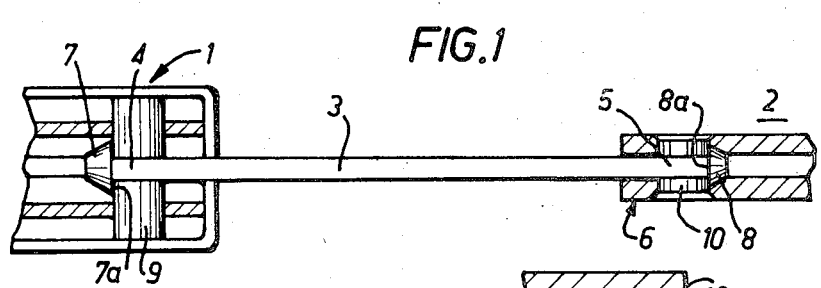
FIG.1
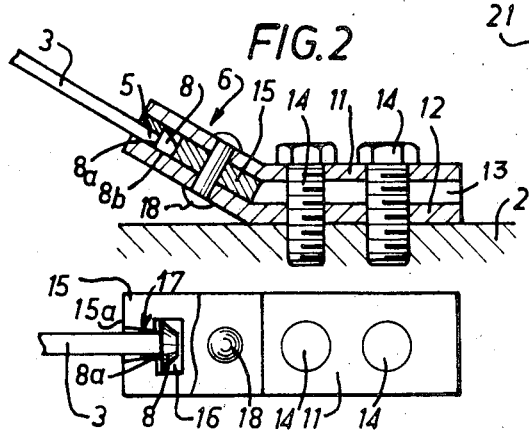
FIG.2
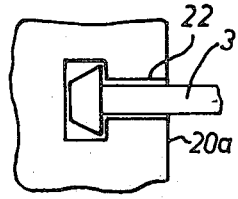
FIG.4
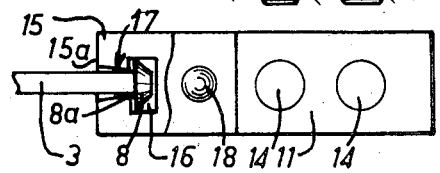
FIG.3
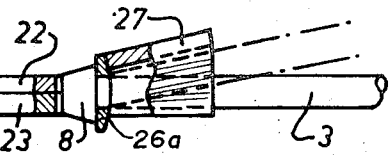
FIG.5
FIG.6
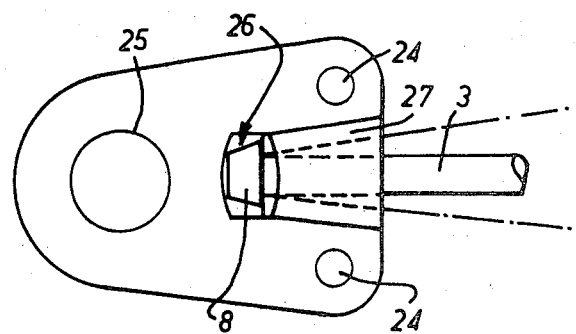
FIG.7

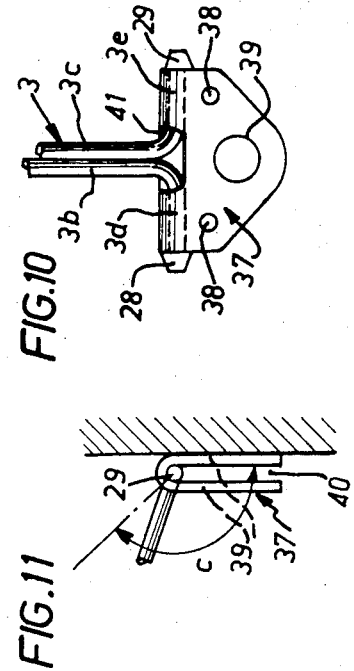
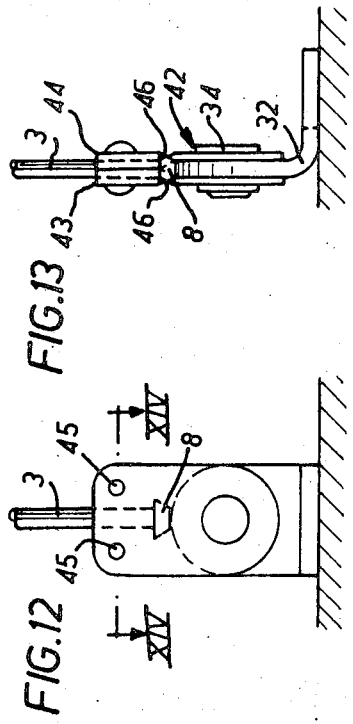
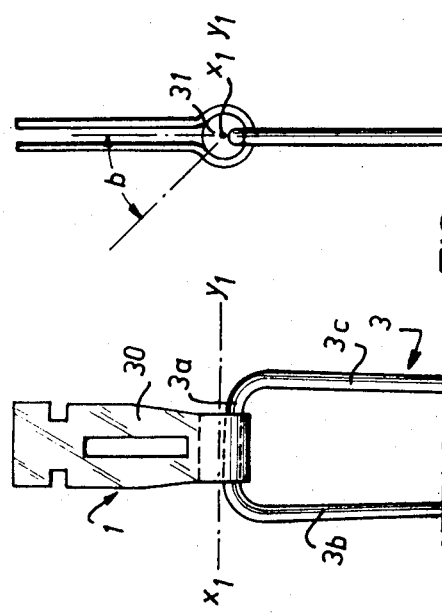
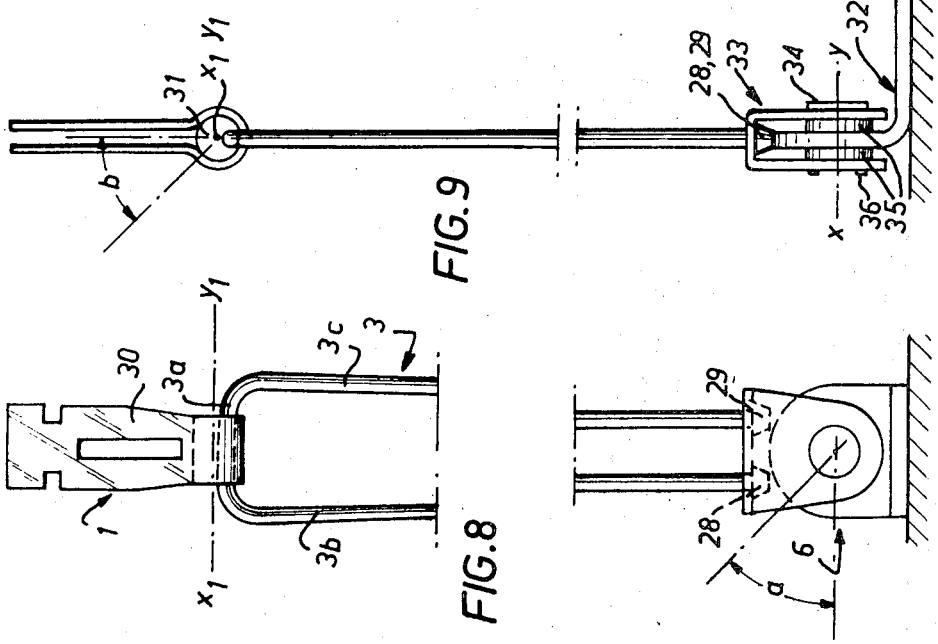

3,820,815

CONNECTING DEVICE FOR ATTACHING SAFETY BELT TO VEHICLE FLOOR

The present invention relates to a connecting device between an attachment member for a safety belt and the floor of an automobile vehicle.

It is known that there may be located, for example between the two front seats of a vehicle, a connection device between an attachment member, onto which the safety belt is fastened, and the floor of the vehicle itself. This connection device, generally known as a central stirrup, sometimes capable of being oriented between the seats, has been constituted up till now of a machined plane metal member, the reinforcement of which enabled it to achieve a resistance to tension greater than that required by safety standards. These standards demand, for the fixing of a single belt, a member having a tensile strength greater than 1,500 kg; this limit being raised to 3,000 kg. for the fixing of two safety belts, for example those of two front seat passengers to a central stirrup disposed between the two seats.

Such members, as well as the machining of their ends to enable them to be fixed to the floor of the vehicle and to the attachment member, have a high initial cost.

It is an objective of the present invention to overcome these disadvantages, by proposing a robust, simple connection, possessing all the required safety requirements and at low initial cost, between the floor of the vehicle and the attachment member to which the safety belt is fastened.

For this purpose, the connection device between an attachment member of a safety belt and the floor of an automobile vehicle is realised by at least one steel bar of small cross-section, of the piano wire type, that is to say possessing at its ends a spread out head formed by cold upsetting.

The connecting means according to the invention possesses the advantage of being very economic to produce, while at the same time guaranteeing a tensile strength greater than required by safety standards.

For example, a steel bar having a diameter of 6 mm. possesses a tensile strength of 3,500 kg. and is therefore capable of accomodating alone, at its upper end, a single attachment member for two safety belts protecting two passengers, since the standard imposed is a resistance to tension at least equal to 1,500 kg. per belt attached.

There are described below, by way of non restrictive examples, various forms of embodiment of the present invention with reference to the attached drawing, in which:

FIG. 1 is a longitudinal sectional view of a connecting bar between an anchorage device on the floor of a vehicle and an attachment member for a safety belt.

FIG. 2 is a vertical section of a variant of embodiment of the point for anchoring the connecting bar to the floor of the vehicle.

FIG. 3 is a plan view, partially cut away, of the anchorage device of FIG. 2.

FIG. 4 is a diagrammatic sectional view of a variant of embodiment of the method of fixing the connection bar into the attachment member of the belt.

FIG. 5 is a plan view of the lower half shell of FIG. 4, showing the way in which the head of the connecting bar is housed in the attachment member.

FIG. 6 is an elevation view of a variant of embodiment of the anchorage device to the floor.

FIG. 7 is a plan view of the anchorage point of FIG. 6.

FIG. 8 is an elevation view of a variant of embodiment of the connection device.

FIG. 9 is a profile view of the connection device of FIG. 8.

FIG. 10 is a plan view of a variant of embodiment of the anchorage device to the floor.

FIG. 11 is a profile view of the anchorage device of FIG. 10.

FIG. 12 is an elevation view of a variant of embodiment of the anchorage device to the floor.

FIG. 13 is a profile view of the anchorage device according to FIG. 12.

FIG. 14 is a horizontal sectional view along the line XIV — XIV of FIG. 12.

FIG. 1 shows an attachment member 1 for a safety belt, not shown. This member 1 is in fact constituted by a casing containing a locking mechanism, and into which a bolt connected to the strap of the belt engages. To connect the attachment member 1 to the floor 2 of the vehicle there is utilized, according to the invention, a bar 3 of the "piano wire" type, fixed by its upper end 4 to the attachment member 1 and by its lower end 5 to an anchorage device, designated generally as 6, which is itself fixed to the floor 2 of the vehicle (FIG. 2).

The connection bar 3 of the "piano wire" type possesses at its ends heads 7 and 8, formed by cold upsetting of the metal. These heads possess, for example, a frustoconical or hemispherical form. A single bar 3 can constitute the connection between the anchorage device 6 and two attachment members 1 corresponding, for example, to the two front seat belts. In this case, and in order to comply with the safety standards, a 6 mm. steel bar is used, possessing a satisfactory tensile strength of 3,500 kg, which is therefore higher than the requirement of the standards. It would of course be possible to use two juxtaposed steel bars 3 of smaller diameter, for example of 4mm, having a tensile strength of 1,800 kg, a value which is also greater than the requirements of the standards. Nevertheless, to avoid bulkyness, it is preferable to utilize only a single bar 3.

This bar 3 may be fixed at its ends in different ways, of which FIG. 1 illustrates only one example. Before the upsetting of the heads 7 and 8, the bar is introduced into two cylindrical shafts 9 and 10, having diametral perforations, which will be fixed respectively to the attachement member 1 and to the anchorage device 6. After upsetting, the plane faces 7a, 8a of the frustoconical or hemispherical heads 7, 8, bearing against the shafts 9, 10, are either the wider base of the truncated cone or the diametral surface of the hemisphere constituting the head. Together with the remainder of the bar 3, these plane faces 7a and 8a ensure a rigid connection between the vehicle floor 2 and the attachment member 1.

FIGS. 2 and 3 illustrate another method of fixing the lower end 5 of the bar 3 to the floor anchorage device 6, this method of fixing being capable of being applied also to the upper end 4 of the bar. The frustoconical head 8 possess a flattened portion 8b over a part of its circumference. In addition, the anchorage piece 6 is constituted of two cranked iron plates 11 and 12, parallel to one another and spaced apart by a gap 13. The anchorage device 6 is fixed to the floor 2 of the vehicle through the agency of any appropriate means, for example bolts 14 passing through the horizontal portions of the two iron plates 11 and 12. Into the part of the gap 13 which is contained between the two inclined portions of the iron plates 11 and 12, there is introduced a cross piece 15 possessing a hole or recess 16, opening out into the front surface 15a of the cross piece 15 through a slot 17 having a width substantially equal to the diameter of the bar 3 but nevertheless less than that of the recess 16. The partially frustoconical head 8 is housed in the recess 16 of the cross piece 15, the bar 3 being engaged in the slot 17. The flattened part 8b of the head 8 then rests flat against the lower plates 12, while the transverse plane surface 8a of the head 8 bears against the facing transverse wall of the recess 16. The plates 11 and 12 and the cross piece 15 are then connected together by any suitable means, for example by a rivet 18. The fixing of the lower end of the bar 3 is thus ensured, while at the same time preventing its rotation relative to the anchorage device 6.

FIGS. 4 and 5 illustrate a method of coupling the upper head 7 of the bar 3 to a belt attachment member 1 comprising a casing constituted of two half shells 19 and 20. In this case, the lower half shell 20 possesses a relatively wide recess 21 in which is housed the head 7, and which communicates with the front face 20a of the half shell 20 by a groove 22 having a width less than that of the recess 21 but at the same time greater than the diameter of the bar 3. The head 7 possess a flattened portion 7b which bears against the bottom of the recess 21 and its front face 7a abuts against a portion of the upper half shell 19. In this way, the attachment member 1 is prevented from rotating relative to the bar 3.

The floor anchorage device shown in FIGS. 6 and 7 comprises two superimposed plates 22, 23, held together by means of rivets 24 and perforated by holes 25 enabling them to be fixed to the floor by means of a screw or bolt, not shown. The two plates 22, 23 are also perforated by superimposed slots 26, into which the frustoconical lower head 8 of the connection bar 3 engages. This head 8 bears, through a washer 26a having a curved surface, against a curved bearing surface bounded firstly by a recess 27 formed by stamping of the upper plate 22, and secondly by the edge of the slot 26 formed in the lower plate 23. This slot 26 opens into the straight edge of the lower plate 23 to permit angular movement of the bar 3 about a vertical axis, as far as two extreme positions indicated in broken lines in FIG. 7. The bar 3 can also pivot about a horizontal and transverse axis, starting from a horizontal position represented in full lines in FIG. 6, ranging as far as an upwardly inclined position indicated in broken lines, the upward pivoting being limited by the recess 27.

In the embodiment shown in FIGS. 8 and 9, the bar 3 is folded to a U shape so as to form an upper horizontal web 3a, connected to the attachment member 1 for the belt, and to be connected to the floor anchorage device 6 by two arms 3b, 3c, ending in two cold upset frustoconical heads 28, 29. The web 3a of the U folded bar 3 is housed in the extreme bent back portion of a strap 30 forming part of the attachment member 1. It is held by a cylindrical shaft 31 from which is cut out a longitudinal slot receiving the web 3a of the bar 3.

The floor anchorage device 6 comprises an angle piece 32, one horizontal flange of which is fixed to the floor and the other vertical flange of which supports a pivoting strap 33. This strap is rotatably mounted about a horizontal shaft 34 passing through holes formed in the two flanges of the strap 33 and in the vertical flange of the angle 32. Washers 35 are threaded onto the shaft and are inserted between the flanges of the strap 33 and the vertical flange of the angle 32, the whole assembly being locked by a circlip 36 fixed to the shaft 34. The heads 28 and 29 of the bar 3 are housed inside the strap 33 and bear, by their plane faces, on the internal surface of the web of this strap.

In this manner, the strap 33 and the bar 3 are able to pivot about a horizontal and longitudinal axis $x - y$, by an angle $a$, while the attachment member 1 can pivot, at the upper end of the bar 3, about a horizontal transverse axis $x1, y1$ by an angle $b$. FIGS. 10 and 11 illustrate a further embodiment of the floor anchorage device, for a bar 3 bent as shown in FIGS. 8 and 9. The anchorage device of FIGS. 10 and 11 comprises a plate folded as a U to form a strap 37, the two horizontal flanges of which are connected by rivets 38 and are perforated by holes 39 for the passage of the fixing member. Between the two horizontal flanges of the strap 37 there is disposed a shim 40 also perforated by a hole aligned with the holes 39. The arms 3b, 3c of the bar 3 are engaged in a hole 41 formed in the central portion of the curved web of the strap 37 and they are then bent over at right angles to form the extreme parts 3d, 3e housed inside the strap and terminating in the cold upset heads 28, 29. The latter bear, through their plane surfaces, against the lateral edges of the strap 37. The extreme parts 3d, 3e are coaxial and constitute a horizontal transverse pivoting axis for the bar 3, which can thus adopt any desired inclination to the horizontal. The hinging angle $c$ is indicated in FIG. 11.

In the embodiment of the anchorage device shown in FIGS. 12 to 14, the device comprises an angle piece 32 fixed to the floor of the vehicle and with a strap 42 pivotally mounted about a shaft 34 on its vertical flange. This strap is contituted of two coupled plates 43 and 44, fixed to each other by means of rivets 45 and gripping the connecting bar 3 between them. The frustoconical head 8 formed at the lower end of the bar 3 projects outwards through slots 46 formed in the two plates 43 and 44. The head 8 bears, through its wider base, against the upper edges of the slots 46 and through its narrower base against the rounded upper edge of the vertical flange of the angle 32. The strap 42 and the bar 3 can therefore pivot about a horizontal longitudinal axis.

What we claim is:

1. In an apparatus for connecting a safety belt to the floor of an automotive vehicle, the combination comprising an attachment member (1) connected to the strap of a safety belt and provided with a connection bar receiving means, an anchorage device (2) fixed to the floor of the vehicle and provided with a connection bar receiving means, a connection bar (3) of the "piano wire" type connecting said attachment member to said anchorage device, said connection bar being relatively small in cross section and provided with broadened out head portions at its ends formed by cold upsetting, said head portions being received in said receiving means of said attachment member and said anchorage device, said head portions and said receiving means each provided with cooperating and abutting bearing faces which securely retain said head portions in said respective receiving means.

2. Device according to claim 1, associated with a belt attachment member comprising a casing constituted of two half shells, characterised in that the head of the bar (3) is disposed in a relatively wide housing (21) of one of the half shells (20), which housing communicates with the front face (20a) of the half shell through a groove (22) having a width less than that of the housing (21) but nevertheless greater than the diameter of the bar (3), the head (7) possessing a flattened portion (7b) bearing against the bottom of the housing (21) and the front face 7a of the head 7 abutting against a part of the other half shell 19.

3. Device according to claim 1, characterised in that the lower head (8) of the bar (3) is housed in a recess formed by two superimposed slots (26) formed in two superimposed plates (22), (23), connected together and fixed to the floor, the head (8) of the bar bearing, through the agency of a washer having a curved surface, onto a curved bearing surface, bounded firstly by a recess (27) formed by stamping of the upper plate (22) and secondly by the edge of the slot (26) formed by the lower plate (23), this latter slot opening into the edge of the lower plate (23), so as to permit angular pivoting of the bar about two horizontal and vertical axes.

4. Apparatus as defined in claim 1, wherein the ends of the connection bar pass through openings diametrally formed in transverse cylindrical shafts carried by the attachment member receiving means and the floor anchorage device receiving means respectively with the plane faces of the upset heads of the connection bar being against these shafts.

5. Apparatus as defined in claim 1, wherein one of the heads of the connection bar is formed with a flattened portion over a portion of its circumference, said head being housed and held in a recess of the receiving means to which the bar is connected so that said flattened portion is against the bottom wall of said recess to thus prevent the bar from axially rotating with respect to said receiving means.

6. Apparatus for connecting a safety belt to the floor of an automotive vehicle as defined in claim 1, wherein said receiving means of said attachment member and said receiving means of said anchorage device include pivoting means permitting pivotal movement of said connection bar with respect to said attachment member and said receiving means.

7. Device according to claim 6, characterised in that the lower extreme portion of the bar (3) is inserted between two coupled plates (43), (44), fixed to each other by means of rivets (45) and constituting a strap (42) pivotally mounted about a longitudinal horizontal axis on the vertical flange of a angle (32) fixed to the floor, the lower head (8) of the bar projecting outside through slots (46) formed in the two plates (43), (44) and bearing against, firstly the edges of these slots (46) and secondly against the rounded upper edge of the vertical flange of the angle (32).

8. In an apparatus for connecting a safety belt to the floor of an automotive vehicle, the combination comprising an attachment member (1) connected to the strap of a safety belt and provided with a connection bar receiving means, an anchorage device (2) fixed to the floor of the vehicle and provided with a connection bar receiving means, a connection bar (3) of the "piano wire" type connecting said attachment member to said anchorage device, said connection bar being relatively small in cross section and provided with broadened out head portions at its ends formed by cold upsetting, said head portions being received in at least one of said receiving means and said head portions and said receiving means being provided with cooperating bearing faces which abut and securely retain said head portions in said receiving means.

9. Device according to claim 8, characterised in that the bar (3) is folded to a U shape so as to form an upper horizontal web (3a) connected to the attachment member (1) of the belt, and to be connected to the floor anchorage point (6) by two arms (3b), (3c) terminating in two heads (28), (29), the web (3a) of the bar 3 contituting a transverse pivotal axis for the attachment member 1.

10. Device according to claim 9, characterised in that the two heads (28), (29) of the bar (3) are housed inside a strap (33) and bear, through their plane surface, against the internal surface of the web of this strap, which strap is articulated about a horizontal longitudinal shaft (34), on a support (32) fixed to the floor.

11. Device according to claim 9, characterised in that the branches (3b), (3c) of the bar (3) are engaged in a hole formed in the centre portion of the web of a strap (37) fixed to the floor and are then folded through a right angle to form the extreme portions (3d), (3e), housed inside the strap and terminating in heads (28), (29) which bear, through their plane surface, against the lateral edges of the strap (37).

* * * * *